United States Patent
Guthrie et al.

(10) Patent No.: US 7,797,139 B2
(45) Date of Patent: *Sep. 14, 2010

(54) OPTIMIZED CYCLE LENGTH SYSTEM AND METHOD FOR IMPROVING PERFORMANCE OF OIL WELLS

(75) Inventors: Charles F. Guthrie, Richmond, CA (US); Anil Patel, Fremont, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 2186 days.

This patent is subject to a terminal disclaimer.

(21) Appl. No.: 10/013,195

(22) Filed: Dec. 7, 2001

(65) Prior Publication Data

US 2003/0110017 A1    Jun. 12, 2003

(51) Int. Cl.
G06F 17/10    (2006.01)
(52) U.S. Cl. .............................. 703/2; 703/10
(58) Field of Classification Search ............ 703/2, 703/10; 700/28; 166/252.1, 250.06, 272.3
See application file for complete search history.

(56) References Cited

U.S. PATENT DOCUMENTS

| | | | |
|---|---|---|---|
| 4,167,470 A | | 9/1979 | Karnofsky |
| 4,470,462 A | * | 9/1984 | Hutchison ............... 166/292 |
| 4,565,249 A | | 1/1986 | Pebdani et al. |
| 4,597,441 A | * | 7/1986 | Ware et al. ............... 166/261 |
| 4,645,005 A | | 2/1987 | Ferguson |
| 4,691,771 A | * | 9/1987 | Ware et al. ............... 166/245 |
| 4,828,031 A | | 5/1989 | Davis |
| 4,838,353 A | * | 6/1989 | Anders ..................... 166/369 |
| 4,962,814 A | | 10/1990 | Alameddine |
| 5,085,276 A | | 2/1992 | Rivas et al. |
| 5,174,377 A | | 12/1992 | Kumar |
| 5,319,781 A | * | 6/1994 | Syswerda ................... 705/8 |
| 5,415,231 A | | 5/1995 | Northrop et al. |
| 5,521,814 A | | 5/1996 | Teran et al. |
| 5,813,798 A | * | 9/1998 | Whiffen ................... 405/52 |
| 5,848,403 A | * | 12/1998 | Gabriner et al. ............ 706/13 |
| 5,924,048 A | | 7/1999 | McCormack et al. |

(Continued)

OTHER PUBLICATIONS

D. Montana et al.; "Genetic Algorithms for complex, real-time scheduling", 1998, IEEE International Conference on Systems, Man and Cybernetics, vol. 3, pp. 2213-2218.*

(Continued)

Primary Examiner—Paul L Rodriguez
Assistant Examiner—Russ Guill
(74) Attorney, Agent, or Firm—Timothy J. Hadlock (57) ABSTRACT

A method of scheduling cyclic steaming of petroleum-containing wells including: inputting to a production-predictor data describing the past cyclic steaming and resulting production of wells; processing the data in the production-predictor and outputting production predictions for the wells during a future steaming cycle; inputting the production predictions into an optimizer; inputting an initial steaming Optimal Cycle Length schedule for the wells into the optimizer; processing the production predictions and the initial steaming cycle schedule in the optimizer by: determining a ranking for the initial steaming cycle schedule for the production predictions against a pre-determined ranking criteria; producing new steaming cycle schedules based on the ranking of the initial steaming cycle a schedule optimization algorithm; determining a ranking for the new steaming schedules against the ranking criteria; repeating the production of schedules and determining ranking steps until some pre-determined termination criteria is met.

24 Claims, 11 Drawing Sheets

U.S. PATENT DOCUMENTS

| | | | |
|---|---|---|---|
| 5,984,010 | A | 11/1999 | Elias et al. |
| 6,002,985 | A | 12/1999 | Stephenson |
| 6,173,775 | B1 | 1/2001 | Elias et al. |
| 6,236,894 | B1 * | 5/2001 | Stoisits et al. ............... 700/28 |
| 6,446,721 | B2 * | 9/2002 | Patel et al. ............... 166/252.1 |
| 6,775,578 | B2 * | 8/2004 | Couet et al. ............... 700/28 |

OTHER PUBLICATIONS

G.L. Curry et al.; "Optimal scheduling for cyclic steam injection projects", 1969, Society of Petroleum Engineers, paper SPE2627, 8 pages.*

K.C. Hong et al.; "Optimization of multicycle steam stimulation", 1969, Society of Petroleum Engineers, paper SPE2328, pp. 357-367.*

R.G. Bentsen et al.; "A Dynamic programming model of the cyclic steam injection process", 1969, Society of Petroleum Engineers, paper SPE2032, pp. 1582-1596.*

Matthew Bartschi Wall, "A Genetic Algorithm for Resource-Constrained Scheduling", 1996, Massachusetts Institute of Technology, pp. 1-62.*

E.R. Martinez et al.; "Application of Genetic Algorithm on the Distribution of Gas Lift Injection", 1994, Society of Petroleum Engineers, paper SPE 26993, pp. 811-818.*

Byron S. Gottfried, "Optimization of a Cyclic Steam Injection Process Using Penalty Functions", 1972, Paper SPE 3329, Society of Petroleum Engineers, pp. 13-20.*

M. Tamim et al.; "Optimization of Cyclic Steam Stimulation Using an Analytical Model", 1998, Society of Petroleum Engineers, paper SPE39553, pp. 457-464.*

E. Escobar et al., "Optimization methodology for cyclic steam injection with horizontal wells", Nov. 6, 2000, SPE paper 65525, pp. 1-12.*

* cited by examiner

| Schedule No. X | | | |
|---|---|---|---|
| Well No. | Steaming Step | Soaking Step | Production Step |
| 1 | Start | Start | Start |
| 2 | | | |
| 3 | | | |
| 4 | | | |
| 5 | | | |
| 6 | | | |
| . | | | |
| . | | | |
| . | | | |
| N | | | |

| Well Information | | | | | | Legend | | User Supplied | |
|---|---|---|---|---|---|---|---|---|---|
| Visualizer Location: | Scheduler Test | | | | | | | Computed | |
| Gauge Setting: | GS#4 | | Import Data | | | | | Not yet implemented | |
| Data file | test.xls | | | | | | | | |
| Total Number of Wells = | 21 | | Display Detail Results | | False | | | | |
| Number | IP | Decay | PF | Soak Period | Steam Consumption | Status on day 0 | Number of Days at this status | | |
| | bbls/day | | | days | BCWeS/day | (PR, SOK, STM) | | | |
| well 1 | 124 | 0.1400 | 32 | 2.00 | 1131 | PR | 39.0 | 2/14/2001 | 30.0 |
| well 2 | 225 | 0.2650 | 40 | 1.00 | 1306 | PR | 32.0 | 2/23/2001 | 23.0 |
| well 3 | 271 | 0.2214 | 35 | 2.00 | 786 | STM | 10.0 | | 1.0 |
| well 4 | 54 | 0.0007 | 30 | 2.00 | 1152 | SI | 39.0 | | 30.0 |
| well 5 | 30 | 0.0500 | 28 | 2.00 | 664 | PR | 18.0 | 9 | 9.0 |

| | | | | | | | | | |
|---|---|---|---|---|---|---|---|---|---|
| | | | | | | | | | |
| | 50 | Population size, 50 to 200 | | | | | | | |
| | 200 | Maximum generations | | | | | | | |
| | | | | | | | | | |
| | | | | | | | | | |
| | | | | | | | | | |
| Strategy | | | | | | | | | |
| | 1 | Selection method, 0 = pure or 1=elitist | | | | | | | |
| | 0.95 | Generation Gap, 0.8 to 1.0 | | | | | | | |
| | 2 | Generation Ratio, 2.0 to 3.0 | | | | | | | |
| | | | | | | | | | |
| Diversity Operators | | | | | | | | | |
| | 0.1 | Diversity Rate, 0.1 to 0.5 | | | | | | | |
| | 0.001 | Diversity Radius, 0.001 | | | | | | | |
| | | | | | | | | | |
| Enumeration Operators | | | | | | | | | |
| | 0 | Crossover type REPEATING_GENES_CROSS = 0, UNIQUE_GENES_ CROSS =1 | | | | | | | |
| | 0.95 | Crossover rate, 0.8 to 1.0 | | | | | | | |
| | 0.01 | Mutation rate, 0.001 TO 0.01 | | | | | | | |
| | | | | | | | | | |
| Extinction Operators | | | | | | | | | |
| | 1.0 | Extinction Period 1.0 to 3.0 | | | | | | | |
| | 0.1 | Extinction Rate 0.1 to 0.5 | | | | | | | |
| | | | | | | | | | |
| Continuous Operators | | | | | | | | | |
| | 1 | Crossover type REPEATING_GENES_CROSS = 0, UNIQUE_GENES_ CROSS =1 | | | | | | | |
| | 0.95 | Crossover rate, 0.8 to 1.0 | | | | | | | |
| | 0.01 | Mutation rate, 0.001 TO 0.01 | | | | | | | |
| | | | | | | | | | |

Fig.7A

| | |
|---|---|
| 3200 | Total steam injection needed for all wells (CWESB) |
| 5 | max # of wells steaming |
| 3 | max # of wells soaking |
| 15 | max # of wells producing |
| 3000 | Steam generation capacity (CWESBD) |
| 7 29 37 | wells that are blocked |
| Other parameters: | |
| 60 | Schedule period - # of days |
| 60 | Production period - # of days |
| 0 | Penalty for "nearness" violation on Grassy wells - B/D |
| 0 | Penalty for missing the steam injection constraints - B/D |
| 1 | Factor for converting Steam to energy equivalent - bbl of FOE/ bbl of steam |
| | 0.371216432 |

…
OPTIMIZED CYCLE LENGTH SYSTEM AND METHOD FOR IMPROVING PERFORMANCE OF OIL WELLS

I. COPYRIGHT NOTICE AND AUTHORIZATION

This patent document contains material which is subject to copyright protection.

(C) Copyright 2001 Chevron Research and Technology Company, a division of Chevron U.S.A. Inc., Inc. All rights reserved.

With respect to this material which is subject to copyright protection. The owner, Chevron Research and Technology Company, a division of Chevron U.S.A. Inc., has no objection to the facsimile reproduction by any one of the patent disclosure, as it appears in the Patent and Trademark Office patent files or records of any country, but otherwise reserves all rights whatsoever.

II. FIELD OF THE INVENTION

This invention relates to a system and method of scheduling cyclic steaming of wells.

III. BACKGROUND OF THE INVENTION

Cyclic Steaming is a method of increasing oil recovery from an oil field where the oil is contained in earth that has low permeability. The low permeability slows or prevents flow of oil thus inhibiting the recovery of oil. Cyclic steaming is a method that greatly increases the permeability of the earth in such a field and at least temporarily increases the oil production from individual wells and the field as a whole. Generally any given well in such an area must be repeatedly steamed as production decreases over time. Typically after a particular steam event a well produces at a high rate for some period of time, but the rate decreases over time until it is no longer producing efficiently and needs to be re-steamed. The rate of decline in production by a given well can vary quite significantly. Also the amount of production to be expected from wells within a particular field can vary radically. It is generally desired to maximize the amount of oil produced in a particular field over time given a finite amount of steam available. Thus given the variability of potential production of individual wells within a field it is important to choose carefully which wells to steam and when to steam them in order to maximize oil produced by the field.

A Patent that describes the Cyclic Steaming process is U.S. Pat. No. 5,085,276 which is herein incorporated by reference in its entirety. Cyclic steaming can be accomplished as follows: The method generally involves the drilling of a wellbore which traverses the low permeability formation. First, a lower interval within the low permeability formation is selected and perforated. Tubing is run into the wellbore, and a thermal packer is set at the upper boundary of the low permeability formation to be produced. Steam is injected into the wellbore through the tubing at sufficient pressure and flow rate to cause the low permeability formation at the first selected lower interval to accept fluid in the case of naturally fractured low permeability formations, or to fracture in other formations such as diatomite. The steam injection is continued until a predetermined quantity of steam has been injected. Following a relatively short "soak" period, the well is allowed to produce back from the first set of perforations. Short steam cycles alternating with production are repeated for the first interval in the wellbore. Next, sand or sand in combination with other material impervious to steam such as cement, or a mechanical isolation device, is placed into the wellbore sufficient to prevent steam from entering the formation through the first set of perforations. A second interval in the low permeability formation is then selected and perforated. Steam is once again flowed from the surface down the wellbore and may enter the formation only through the new second set of perforations due to the impervious sand or other blocking means in the wellbore. After a predetermined amount of steam is flowed into the formation to cause controlled fracturing from the second set of perforations, the steam flow is ceased and after another short soak period of about five days, the well is allowed to produce from the second interval. Again, alternating steam and production cycles of short duration without a significant period in between due to well pump pulling is accomplished. The sequence of perforating, steam fracturing, and cycle steaming and producing the new fractures, followed by sanding back or otherwise isolating, and repeating at an upper interval is repeated until a desired amount of the low permeability formation has been fractured and completed by the controlled technique of the present invention.

When the final set of perforations has been completed, steamed and produced for several cycles, the sand, isolating device or other steam impervious material is circulated out, or drilled through, so as to open all the perforations and place the fractured intervals in fluid communication with the wellbore. Steam from a surface steam generator may then be flowed down the tubing and into the entire set of previously isolated perforations, and after a short cycle of steam followed by a soak period, the well is returned to the production mode. Alternatively, any single or set of fractured intervals may be isolated and selectively re-steamed.

As mentioned above it is desired to maximize the amount of oil produced using Cyclic Steaming, or minimize steam usage or total cost or optimize some other criteria, in a particular field over time given a finite amount of steam available. The method of the present invention provides a means for producing an optimized steaming schedule in order to optimize for selected optimization criteria.

IV. SUMMARY OF THE INVENTION

The invention includes a method of scheduling cyclic steaming of a group of petroleum-containing wells including: inputting to a production-predicting means a group of data describing at least in part the past cyclic steaming and resulting production of a group of petroleum-containing wells; processing the data in the production-predicting means and outputting a group of production predictions for the group of wells during a future steaming cycle; inputting the group of production predictions into an optimization means; inputting an initial steaming cycle schedule, optional from an Optimum Cycle Length Scheduling means, for the group of wells into the optimization means; processing the group of production predictions and the initial steaming cycle schedule in the optimization means by the steps including: determining a ranking for the initial steaming cycle schedule for the group of production predictions against a pre-determined ranking criteria; producing a group of new steaming cycle schedules based on the ranking of the initial steaming cycle a schedule optimization algorithm; determining a ranking for the new steaming cycle schedules against the pre-determined ranking criteria; repeating the production of new steaming cycle schedules and determining ranking steps until some pre-determined termination criteria is met; and outputting a final steaming cycle schedule.

Another embodiment includes a method of scheduling cyclic steaming of a plurality of petroleum-containing wells including: inputting to a production-predicting means a plurality of data describing at least in part the past cyclic steaming and resulting production of a plurality of petroleum-containing wells; processing the data in the production-predicting means and outputting a plurality of production predictions for the plurality of wells during a future steaming cycle; inputting the plurality of production predictions into an Optimal Cycle Length Scheduling means configured to produce a steaming cycle schedule; and outputting the steaming cycle schedule.

In other embodiments the invention includes systems configured and adapted to perform the steps listed in the above-described methods, and computer readable media containing computer readable instructions configured and adapted to perform the steps listed in the above-described methods.

One system embodiment of the invention includes a system for scheduling cyclic steaming of a group of petroleum-containing wells including: a production-predicting means configured for receiving an input of a group of data describing at least in part the past cyclic steaming and resulting production of a group of petroleum-containing wells, and for processing the data outputting a group of production predictions for the group of wells during a future steaming cycle; an optimization means configured for receiving as input the output of the production-predicting means and for receiving as input steaming cycle schedules for the group of wells, and for processing the group of production predictions and the steaming cycle schedules by the steps including: determining a ranking for the initial steaming cycle schedule for the group of production predictions against a pre-determined ranking criteria; producing a group of new steaming cycle schedules based on the ranking of the initial steaming cycle a schedule optimization algorithm; determining a ranking for the new steaming cycle schedules against the pre-determined ranking criteria; repeating the production of new steaming cycle schedules and determining ranking steps until some pre-determined termination criteria is met; and outputting a final steaming cycle schedule.

These and other features and advantages of the present invention will be made more apparent through a consideration of the following detailed description of a preferred embodiment of the invention. In the course of this description, frequent reference will be made to the attached drawings.

VI. DETAILED DESCRIPTION OF PREFERRED EMBODIMENTS

The major components (also interchangeably called aspects, subsystems, modules, functions, services) of the system and method of the invention, and examples of advantages they provide, are described below with reference to the figures. For figures including process/means blocks, each block, separately or in combination, is alternatively computer implemented, computer assisted, and/or human implemented. Computer implementation optionally includes one or more conventional general purpose computers having a processor, memory, storage, input devices, output devices and/or conventional networking devices, protocols, and/or conventional client-server hardware and software. Where any block or combination of blocks is computer implemented, it is done optionally by conventional means, whereby one skilled in the art of computer implementation could utilize conventional algorithms, components, and devices to implement the requirements and design of the invention provided herein. However, the invention also includes any new, unconventional implementation means.

Figure 1:
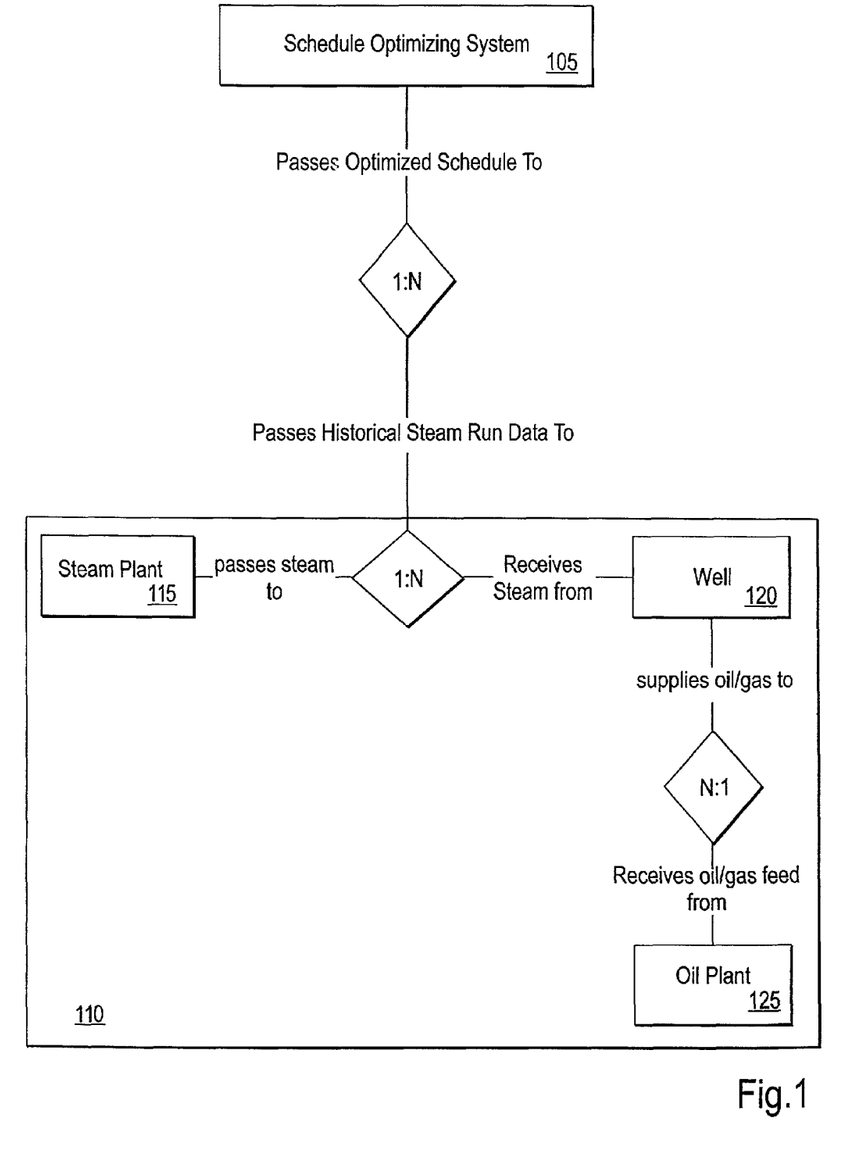
FIG. 1 is a schematic diagram combining aspects of a conceptual data model/entity-relationship diagram showing the environment of the invention and its relationship to other systems.

FIG. 1 is a schematic diagram combining aspects of a conceptual data model/entity-relationship diagram showing the environment of the invention and its relationship to other systems. Petroleum-well field 110 includes several wells 120, at typically one oil plant 125 and one steam plant 115. During the steaming phase of a cyclic steaming process, steam plant 115 passes steam to one or more of wells 120. During the production stage of a cyclic steaming process, one or more of wells 120 pass petroleum such as oil and gas as well as any steam and water in the well to oil plant 125. There the recovered material is treated, e.g., to remove water and separate oil from gas.

When applying the method and system of the invention, the timing of the phases of the cyclic steaming process substantially occur in accordance with the schedule produced by Schedule Optimization System 105. Historical information from petroleum-well field 110 such as details of prior cyclic steaming runs, including water and steam usage, cost, and petroleum production, are input to Schedule optimization System 105. Schedule Optimization System 105 utilizes this information optionally in conjunction with other information in certain algorithms to produce a new cyclic steaming process schedule optimized for meeting pre-determined optimization criteria. Further details of this process are described below.

When applying the method/system of the invention in commercial use, linkage between the Schedule Optimization System 105 and petroleum-well field 110 is optionally electronic, manual, or other known linkage means. That is, input of data from petroleum-well field 110 to Schedule Optimization System 105 may be manual or it may be transferred via data collection or storage systems installed in the petroleum-well field 110. Such systems could include electronic or physical measurement devices, gauges, databases, and related equipment known in the art.

Similarly, application to the petroleum-well field 110 of the schedule output from the Schedule Optimization System 105 may be manual, automated, or mixtures thereof. That is, in an automated application, the output schedule could be electronically transferred or read by a controller system which sends appropriate signals to subsystems for controlling the valves and other equipment used to time the different phases of the cyclic steaming process. In a manual application, a human operator reads a paper or electronic version of the schedule output and manually adjusts the necessary valves and other equipment at the proper times to carry out the schedule.

Figure 2:
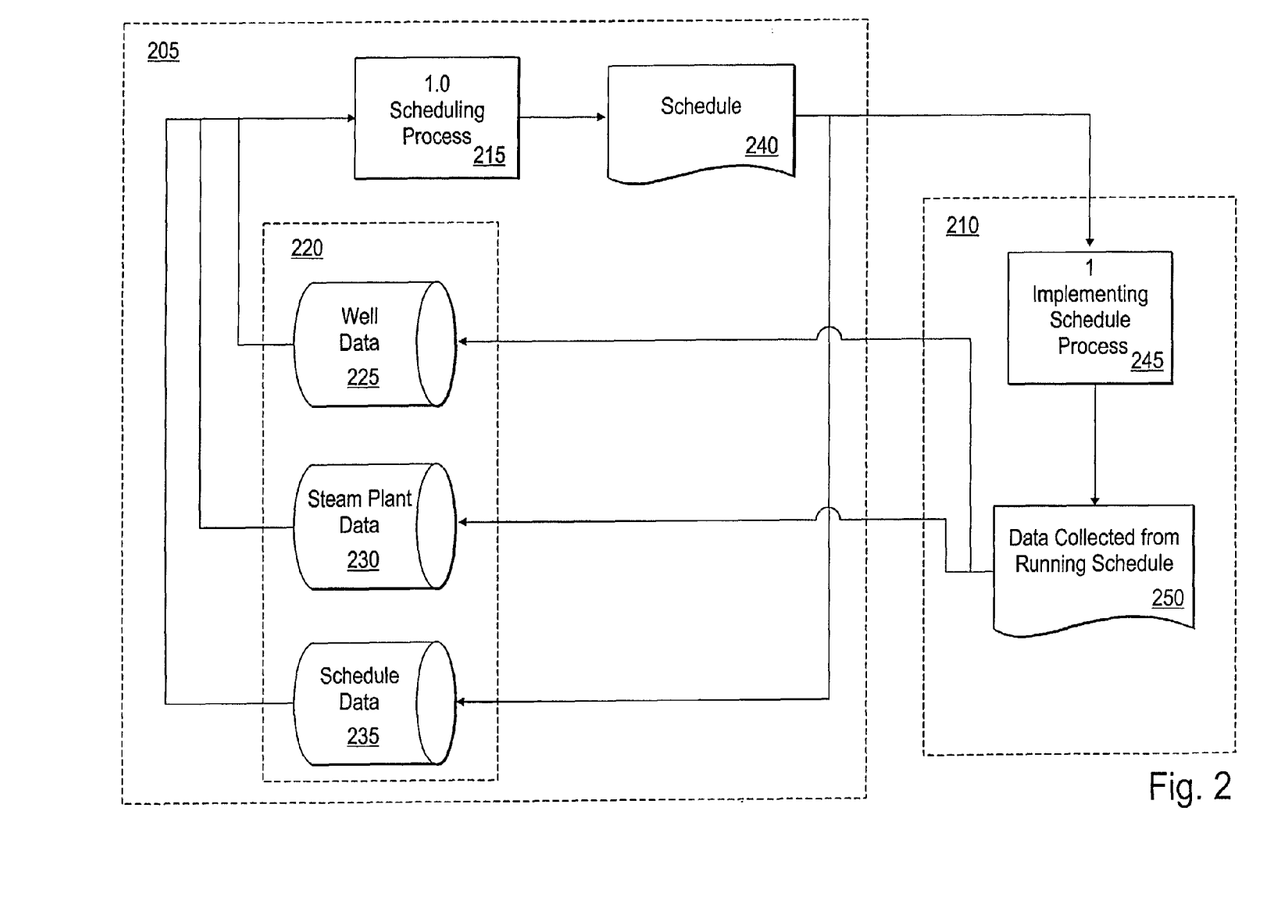
FIG. 2 is a schematic block system level 0 flow chart diagram/system diagram of one embodiment of the invention.

FIG. 2 is a schematic block system level 0 flow chart diagram/system diagram of one embodiment of the invention. Schedule Optimization System 205 includes Scheduling Process 215, Output Schedule 250, datastore 220 which includes Well Data base 225, Steam Plant Database 230, and Schedule Database 235. Datastore 220 is optionally external to, and not a component of, Schedule Optimization System 205. The databases may be designed in a variety of ways known to those skilled in the database arts. For example, there may be separate or a single database for each data type. The databases may be special purpose databases solely for use by the Schedule Optimization System 205 or they may be pre-existing databases also accessed by, or part of, other applications or systems.

Additional databases (not shown) are also accessed by, or internal to, the Scheduling Process 215. These optionally include a database for output of a reservoir simulator which models the effects on oil production of several parameters of multiple petroleum-containing wells. The simulator typically is theoretically-based and the parameters may include steam quality and quantity. Another database (not shown) is a database of output from a steam cycle simulator which uses past oil production curves and steam cycle data or curve-fitted data to predict a future oil production curve.

Schedule Database 235 includes historical information of prior cyclic steaming cycles and resulting production, cost, or other information of interest resulting from implementing the various prior run steaming cycles. The Steam Database 230 includes prior steam production and usage rates for past run schedules and for different wells. Well Database 225 includes data representing oil production and other information of interest, typically as function of days of steaming run, for past steaming cycles.

Figure 3A:
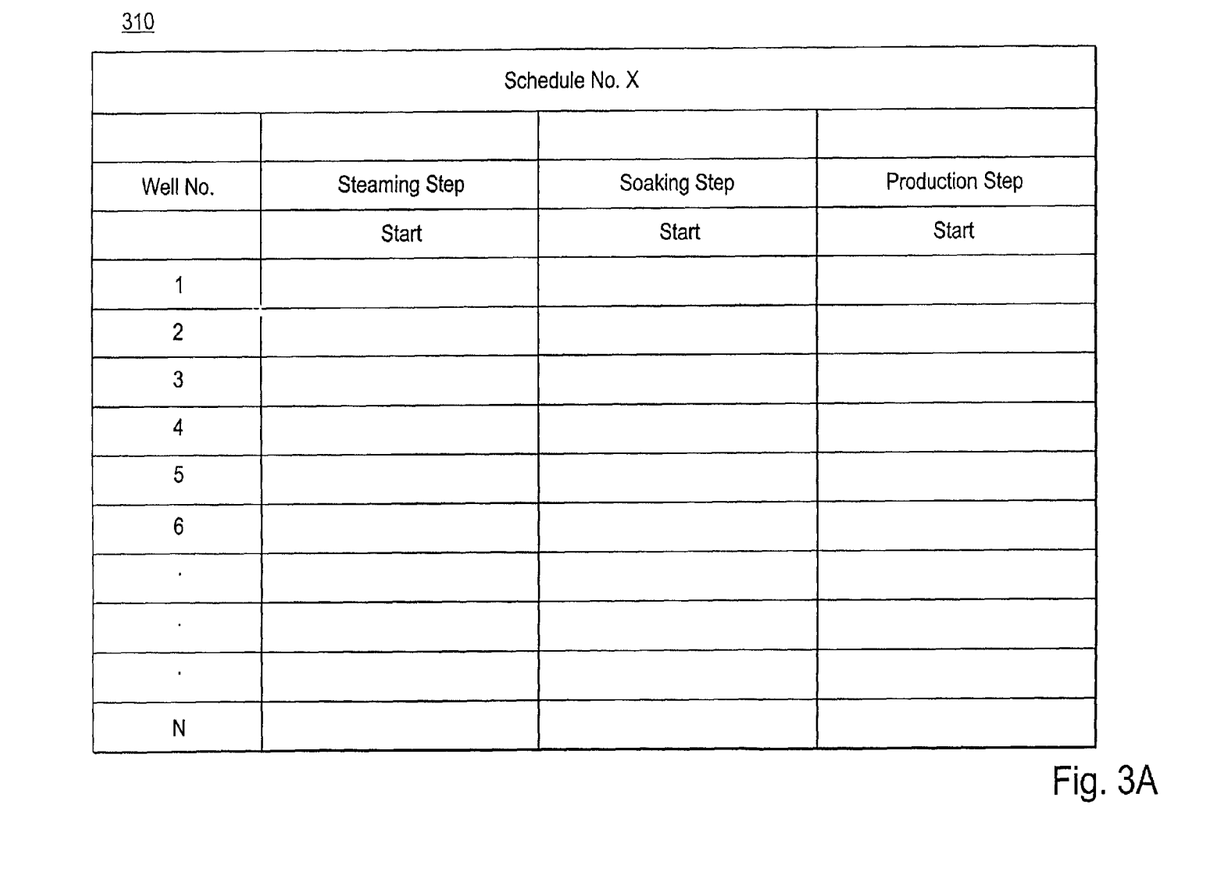
FIGS. 3A and 3B, respectively, depict an embodiment of a conceptual view of a schedule output, and one graphical Gantt Chart view, by the process of the invention and/or the information stored in the schedule database.
Figure 3B:
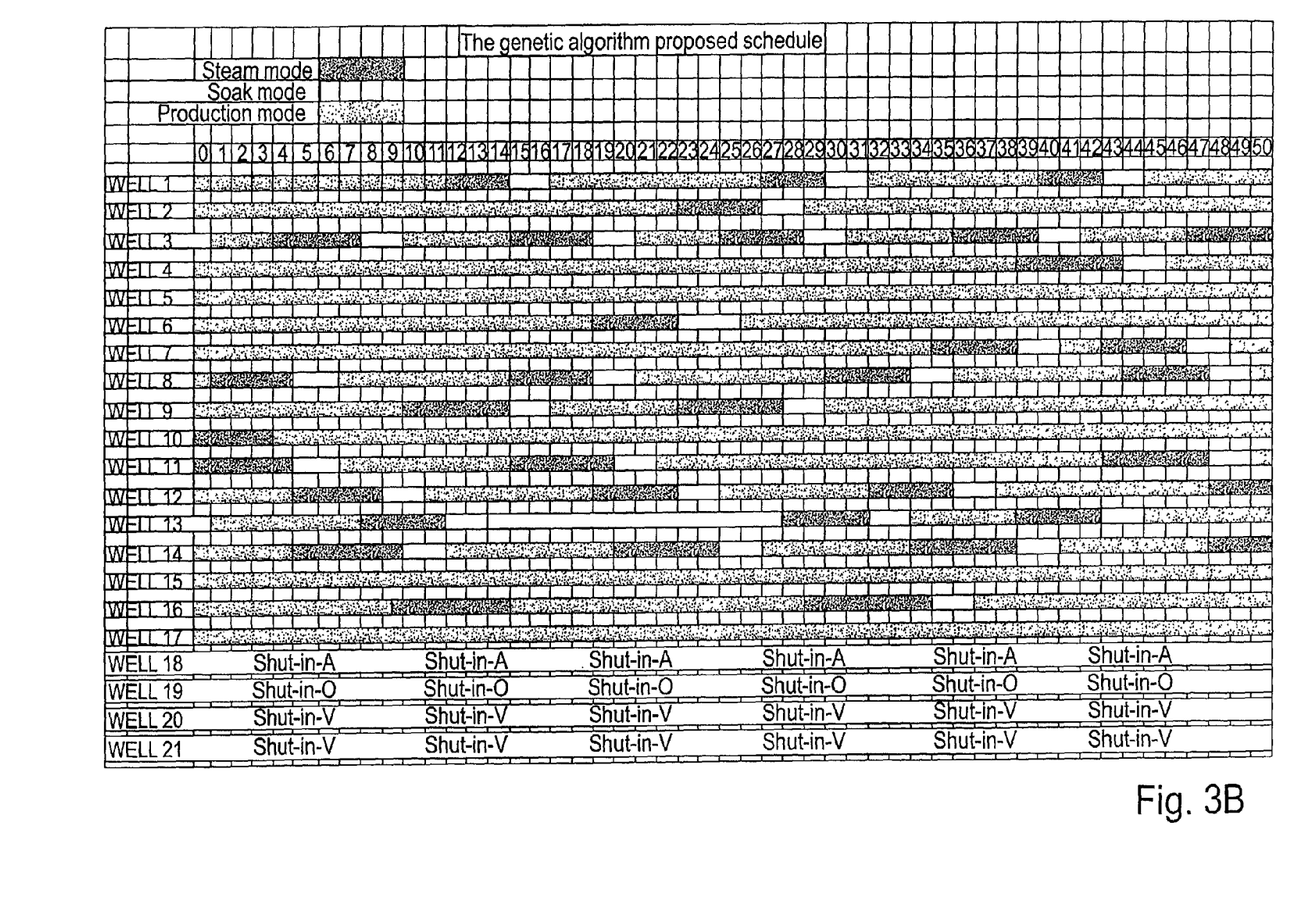

Updated information from each Database is passed to Scheduling Process 215. A final Schedule 240 is the output of Scheduling Process 215. FIG. 3A depicts one embodiment a conceptual view 310 of a final Schedule 240. FIG. 3B is a Gantt chart view. Final Schedule 240 is passed to Schedule Database 235 for updating the database, and optionally to an Implementation System 210 for application. In this optional embodiment, the final Schedule 240 is implemented, electronically or manually or by combined means, in Implementing Schedule Process 245. Data collected 250 from running final Schedule 240 is passed to the respective databases 225 and 230 for updating those databases. Greater details of Scheduling Process 215 are given in FIG. 4 below.

Figure 4A:
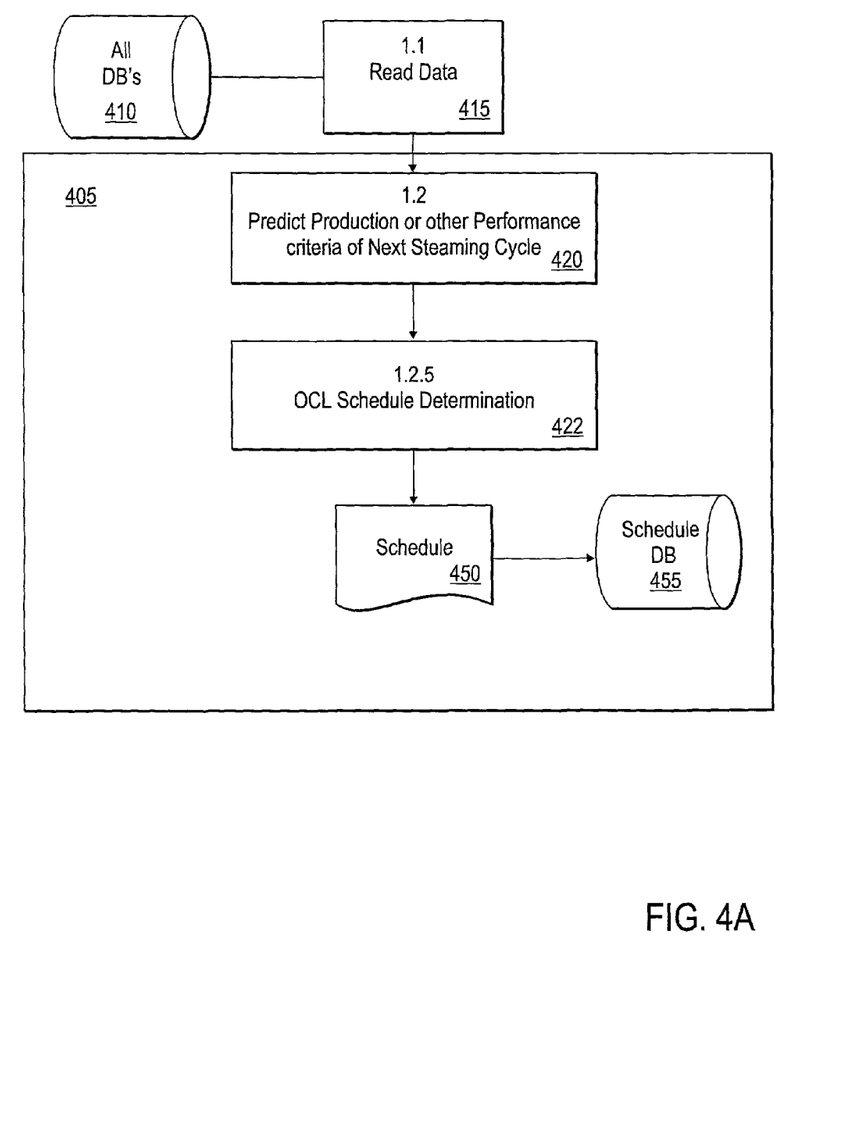
FIG. 4A is a schematic level 1 data flow diagram (a first decomposition of the system diagram in FIG. 2) and shows logical data flow between major processes of one embodiment of the invention.
Figure 4B:
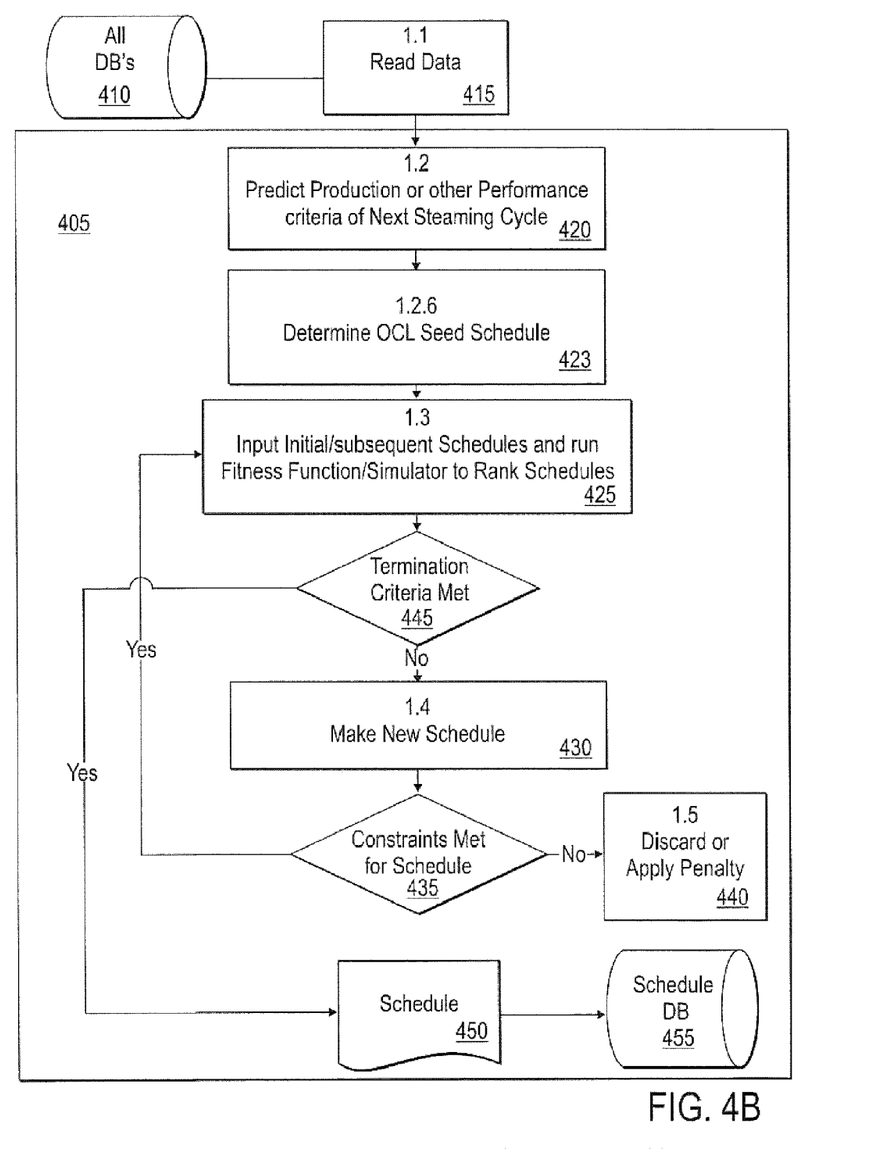
FIG. 4B is a schematic level 1 data flow diagram and shows logical data flow between major processes of another embodiment of the invention where Optimal Cycle Length is the only scheduling means.

FIG. 4B is a schematic level 1 data flow diagram (a first decomposition of the system diagram in FIG. 2) and shows logical data flow between major processes of one embodiment of the invention. Data as needed from all Databases 410 (collectively shown as a single database for simplification) is read in Read Data Process 415 which is optionally internal or external to Scheduling Process 405. All or a portion of the read data is passed to Predict Production or Other Performance Criteria of Next Steaming Process 420 ("Prediction Process 420"). In one embodiment of this process, oil production curve-fitted data is input from past steaming cycles, the process applies a predictive algorithm such as regression analysis, and outputs a predicted oil production curve for a future steaming cycle. Alternative output could include predicted cost or steam usage curves.

The output from Prediction Process 420, and any other needed data from Read Data Process 415, passes to Input Initial/subsequent Schedules and run Fitness Function/Simulator to Rank Schedules Process 425 ("Fitness Function Process 425"). This process, in one embodiment is a simulation algorithm for simulating one or more proposed steam cycles in light of the output, e.g., oil production curves, from Prediction Process 420. Such an algorithm typically steps through each phase of the steaming cycle in the schedule being simulated, and accesses the predicted oil production curves as needed to predict the performance criteria of interest, in this case, total oil production over the course of the tested schedule. The initial seed schedule, in one embodiment of the invention, is determined using an Optimal Cycle Length determination process 422 ("OCL"). This is an intermediate step between Prediction Process 420 and Rank Schedules Process 425. OCL is discussed later in this disclosure in the discussion of FIG. 4A.

Typically, several schedules are tested and then ranked based on the selected performance criteria. For example, a portion of schedules having the highest oil production are selected to survive and the remaining tested schedules are discarded. The surviving schedules from Fitness Function Process 425 are passed to Make New Schedules Process 430. In this process one or more optimization algorithms utilize the surviving schedules to make new schedules for testing. The output of several proposed schedules are passed to decision module 435 to verify of certain pre-determined constraints are met. Such constraints include, e.g., total steam usage in a proposed steaming cycle not exceed total available steam from the steam plant. A sample constraint sheet is shown in FIG. 7B.

There are various methods of handling proposed schedules which fail the constraints. Failing schedules may be passed to Discard or Apply Penalty Process 440 ("Penalty Process 440"). There the failing schedule is discarded or a penalty is added such that it is effectively discarded in that it will not survive the next testing in the Fitness Function Process 425. If the penalty method is applied to the failed schedules, then the failed schedules and other schedules are passed back to Fitness Function 425. This loop continues until pre-determined termination criteria are met. This is tested in Termination Criteria Met Process 445. In this process, e.g., the percent increase in oil production over prior schedules is determined and if it falls below a pre-set amount, the schedule passing the pre-determined termination criteria is the final Schedule output 450. The final Schedule 450 is stored in Schedule Database 455.

Various optimization algorithms known in the art may be utilized in the Make New Schedules Process 430. These include genetic algorithms. Genetic algorithms attempt to simulate natural selection by selecting the most fit schedules from which to produce new schedules (offspring). Typically several generations of schedules may be produced before one meets the termination criteria. Genetic algorithms are described in U.S. Pat. No. 6,182,057 entitled Device, Method, And Program Storage Medium For Executing Genetic Algorithm, and U.S. Pat. No. 5,924,048 entitled Automated Material Balance System For Hydrocarbon Reservoirs Using a Genetic Procedure, which are each incorporated herein by reference in their entirety. Non-patent information includes, e.g., *Introduction to Genetic Algorithms*. Genetic algorithm software source code is available free over the Internet and available commercially. Commercially available genetic algorithm programs include Gene Hunter™ from Ward Systems Group Inc. and Evolver from Palisade Corp. Other potential known algorithms for use in the Make New Schedules Process 430 include simulated annealing, mixed integer nonlinear programming, hill climbing, and combinations thereof.

FIG. 4A is an alternate schematic level 1 data flow diagram and shows logical data flow between major processes of another embodiment of the invention. The difference between this embodiment and that of FIG. 4B is that OCL Schedule Determination process 422 replaces Determine OCL Seed Schedule 423, Rank Schedules process 425, Termination Criteria met step 445, Make New Schedule step 430, Constraints Met step 435, and Discard/Penalty step 440.

The OCL Schedule Determination process 422 includes, but is not limited to, the following steps and all equivalent variations thereof:

The mathematical definition is:

$$\text{Vary } t_{prod} \text{ to maximize} \frac{f(t)}{t_{stm} + t_{soak} + t_{prod}}$$

where:
$t_{stm}$=steaming time
$t_{soak}$=soak time
$t_{prod}$=production time
f(t)=an objective function, for example $$\int_0^{t_{prod}} (\text{Production Curve}) dt$$

$OCL=t_{stm}+t_{soak}+t_{prod}$

The initial state of each well and how long it has been in that state must be known in order to start the OCL scheduling algorithm. The algorithm proceeds as follows:
(1) Start with day 1.
(2) Change the status of all wells that are through steaming to soaking. Change the status of all wells that are through soaking to producing.
(3) For each well that is producing, calculate the deviation from OCL, i.e. OCL—current cycle length.
(4) Sort this list in ascending order.
(5) Work your way down this list until one of the following occurs: (a) You hit a constraint (such as steam availability) or (b) You run out of wells which are past their OCL, i.e. their deviation from OCL is negative.
(6) Move to the next day.
(7) If the schedule horizon has not yet been reached, return to step 2.

Figure 5:
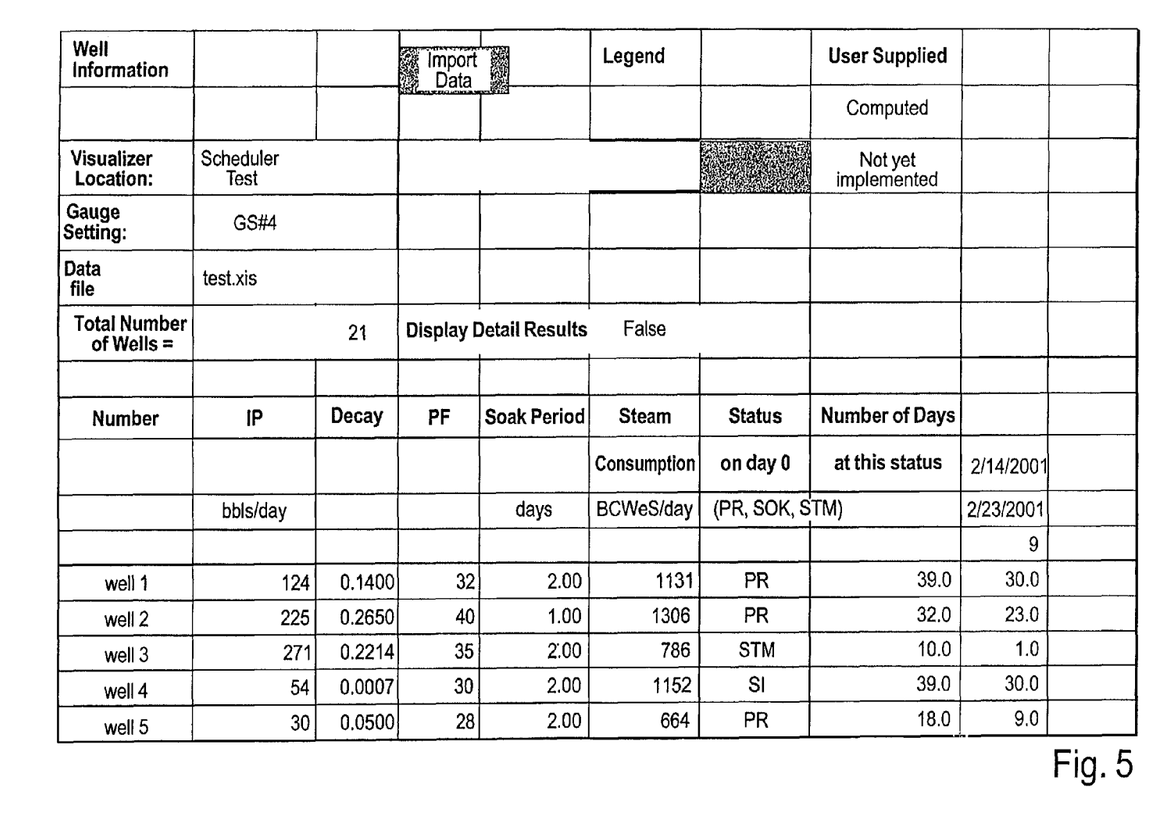
FIG. 5 depicts in one detailed embodiment of a conceptual view of well-production-prediction data used in testing new schedules for meeting selected objectives in accordance with the invention.
Figure 6:
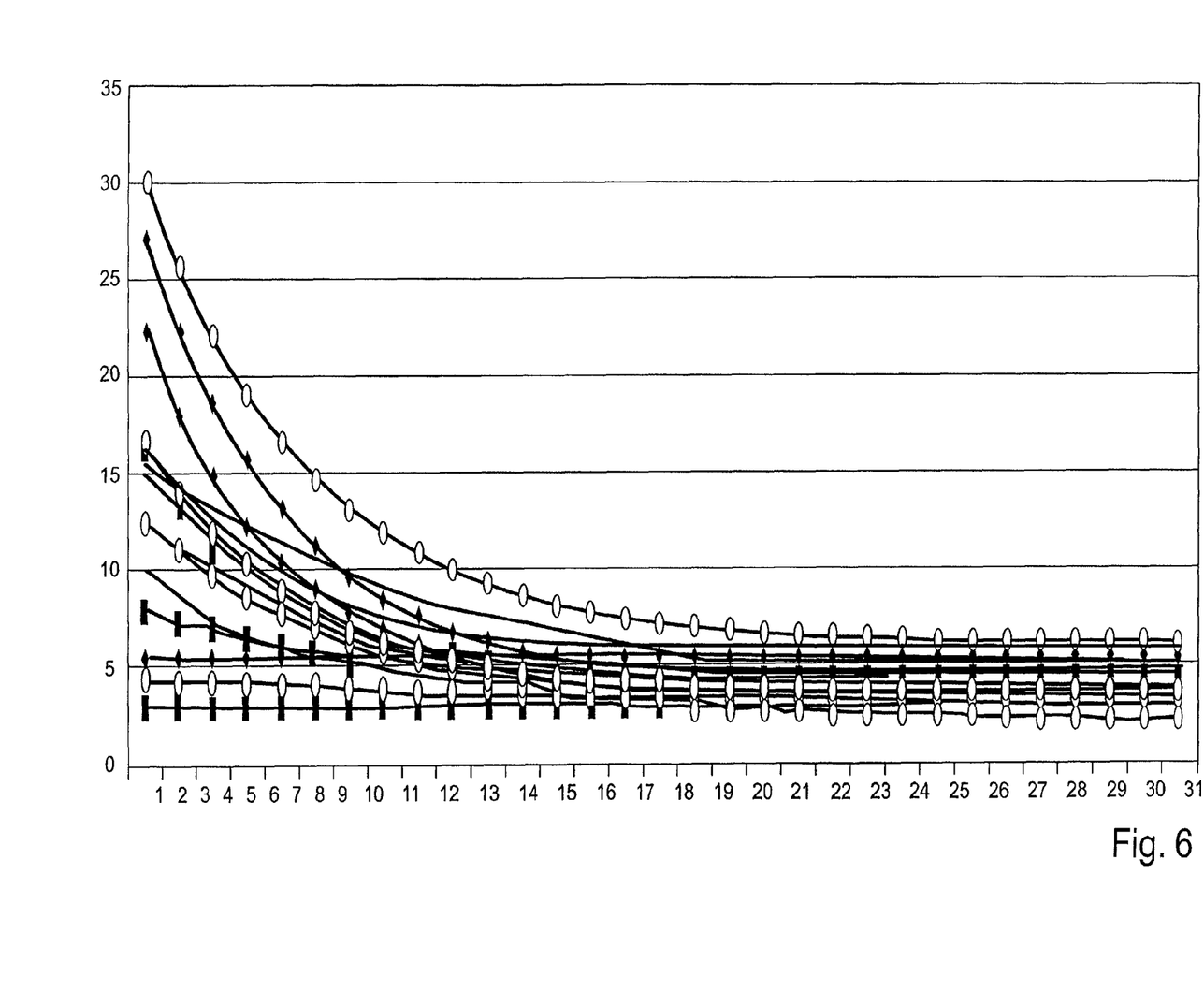
FIG. 6 depicts an exemplary embodiment in graphical format of past well-production data input to the well-production-prediction means.

FIG. 5 depicts in one detailed embodiment of a conceptual view of well-production-prediction data used in testing new schedules for meeting selected objectives in accordance with the invention. FIG. 6 depicts an exemplary embodiment in graphical format of curve-fitted graphs of past well-production data input to the well-production-prediction means.

Figure 7A:
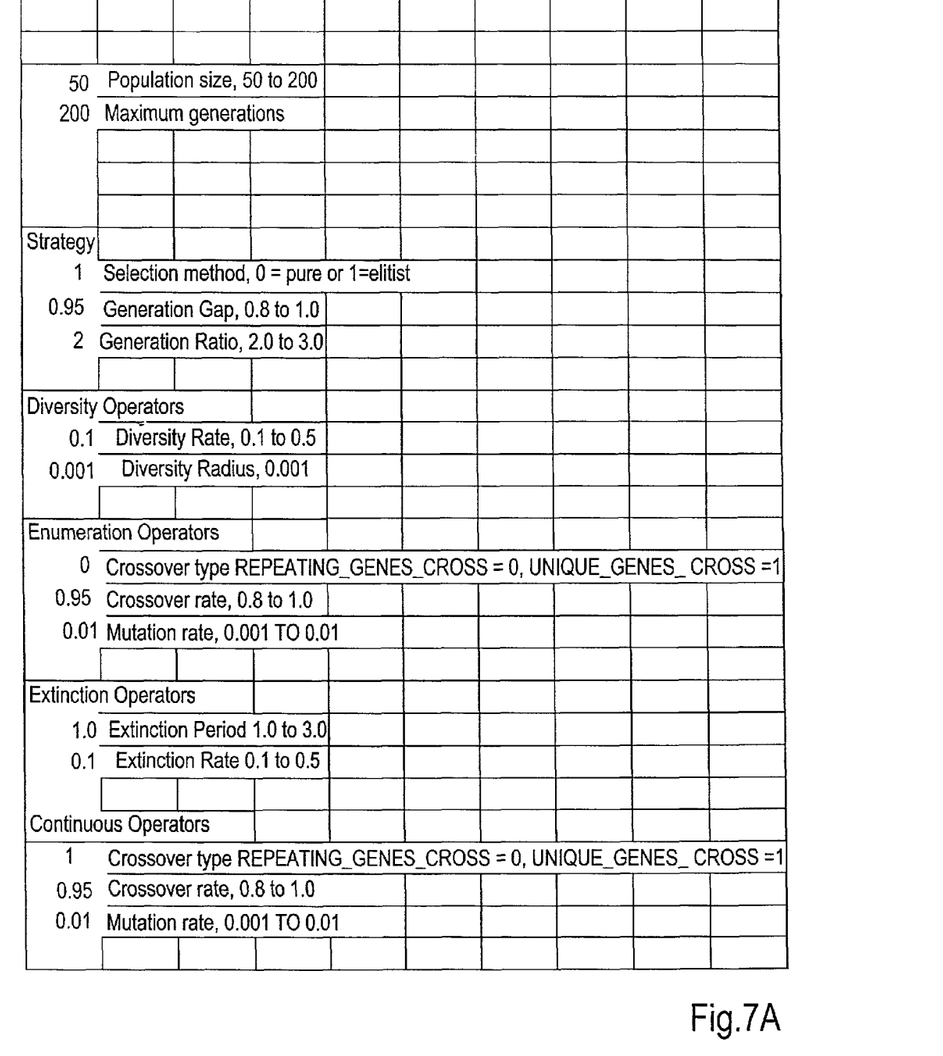
FIGS. 7A and 7B depict, respectively, one embodiment of pre-selected processing parameters used in the invention embodiment employing a genetic algorithm, and constraints selected, as part of the schedule optimization processing.
Figure 7B:
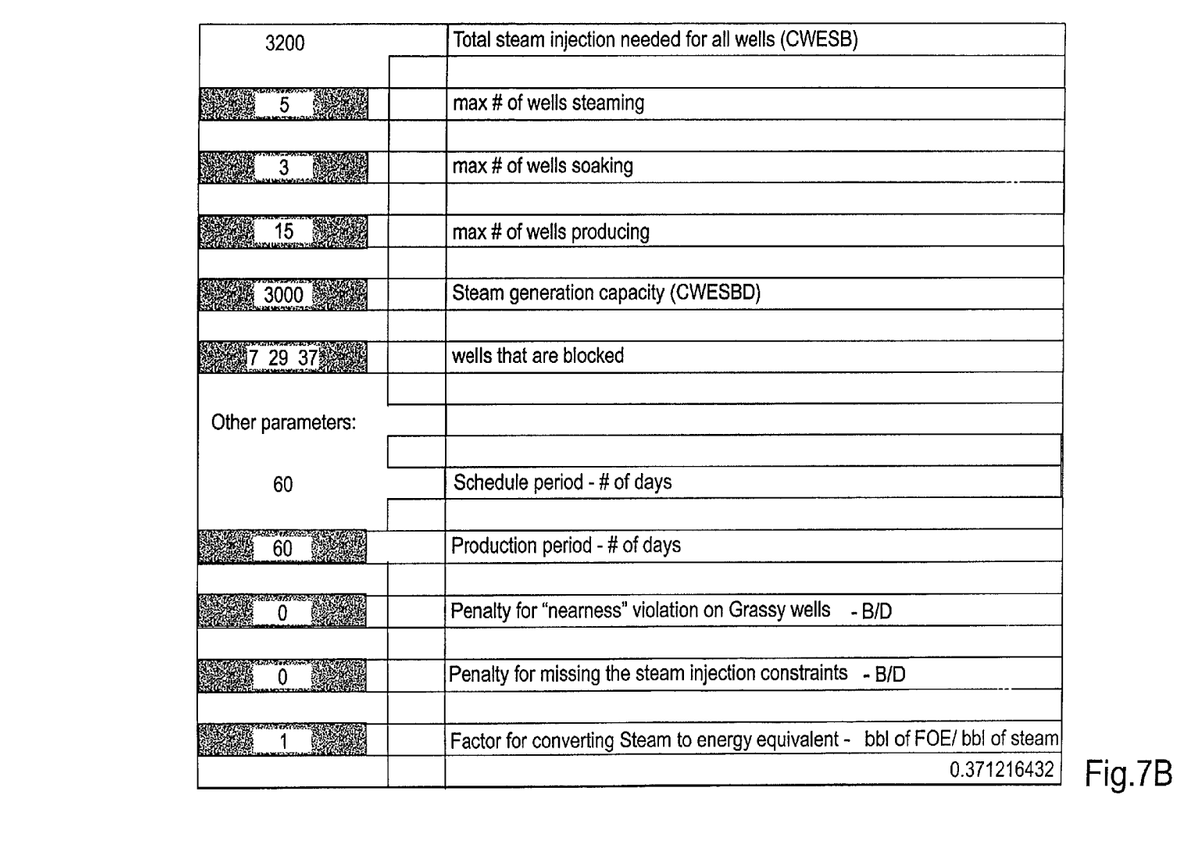
Figure 8:
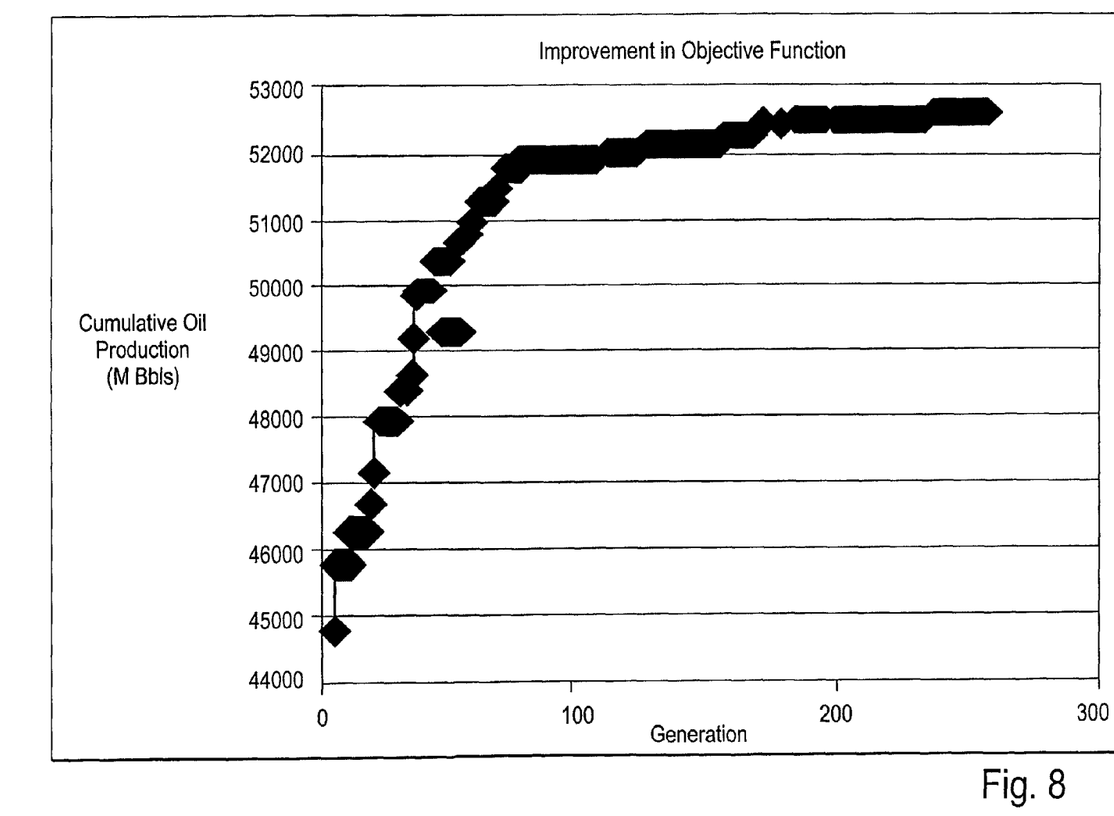
FIG. 8 depicts one embodiment of a graphical display of change-of-oil production as a function of genetic algorithm generations, for use in the termination-criteria element of the invention.

FIGS. 7A and 7B depict, respectively, one embodiment of pre-selected processing parameters used in the invention embodiment employing a genetic algorithm, and constraints selected, as part of the schedule optimization processing. FIG. 8 depicts one embodiment of a graphical display of change-of-oil production as a function of genetic algorithm generations, for use in the termination-criteria element of the invention. Various other termination-criteria may be used.

What is claimed is:

1. A method of scheduling cyclic steaming of a plurality of petroleum-containing wells comprising:
  (a) inputting to a production-predicting means a plurality of data describing at least in part past cyclic steaming and resulting production of a plurality of petroleum-containing wells, wherein said production-predicting means comprises a computer-implemented component stored in a computer memory, and is processed in a computer processor in communication with said computer memory and a computer storage, an computer input and an computer output devices;
  (b) processing said data in said production-predicting means and outputting a plurality of production predictions for said plurality of wells during a future steaming cycle;
  (c) inputting said plurality of production predictions into an Optimal Cycle Length (OCL) scheduling means adapted and configured for varying $t_{prod}$ to maximize the equation $$\frac{f(t)}{t_{stm} + t_{soak} + t_{prod}}$$

where $t_{stm}$ is steaming time, $t_{soak}$ is soaking time, $t_{prod}$ is production time, and f(t) is an objective function of time t, thereby producing an initial steaming cycle schedule;
  (d) inputting said plurality of production predictions and said initial steaming cycle schedule for said plurality of wells into an optimization means;
  (e) processing said plurality of production predictions and said initial steaming cycle schedule in said optimization means by the steps comprising:
    (1) determining a ranking for said initial steaming cycle schedule for said plurality of production predictions against pre-determined ranking criteria;
    (2) producing in a schedule optimization algorithm a plurality of new steaming cycle schedules based on said ranking of said initial steaming cycle schedule;
    (3) determining a ranking for said new steaming cycle schedules against said pre-determined ranking criteria;
    (4) repeating said production of new steaming cycle schedules and determining ranking steps until a pre-determined termination criteria are met; and
    (5) outputting a final steaming cycle schedule.

2. The method of claim 1, wherein said schedule optimization algorithm is a genetic algorithm.

3. The method of claim 2, wherein said genetic algorithm receives as input a plurality of chromosomes consisting of cyclic steaming schedules and the ranking criteria for each, mixes portions of two or more of each of said schedules to produce new schedules.

4. The method of claim 3, further comprising randomly modifying at least a portion of said new schedules, thereby resulting in modified new schedules which are not direct combinations of portions of the input schedules.

5. The method of claim 1, wherein said pre-determined ranking criteria are selected from the group consisting of total production, total steam usage, total water production, total cost, total energy efficiency, and mixtures thereof.

6. The method of claim 1, wherein said pre-determined termination criteria are selected from the group consisting of total iterations, percent change in said ranking criteria, and mixtures thereof.

7. The method claim 1, wherein said inputting step (a) further comprises inputting to said production-predicting means the output of a reservoir simulation means which models past steaming cycles of a plurality of petroleum-containing wells.

8. A method of scheduling cyclic steaming of a plurality of petroleum-containing wells comprising:
(a) inputting to a production-predicting means a plurality of data describing at least in part past cyclic steaming and resulting production of a plurality of petroleum-containing wells, wherein said production-predicting means comprises a computer-implemented algorithm stored in a computer memory, and is processed in a computer processor in communication with said computer memory and a computer storage, an computer input and an computer output devices;
(b) processing said data in said production-predicting means and outputting a plurality of production predictions for said plurality of wells during a future steaming cycle; and
(c) inputting said plurality of production predictions into an Optimal Cycle Length (OCL) scheduling means adapted and configured for varying $t_{prod}$ to maximize the equation $$\frac{f(t)}{t_{stm} + t_{soak} + t_{prod}}$$

where $t_{stm}$ is steaming time, $t_{soak}$ is soaking time, $t_{prod}$ is production time, and f(t) is an objective function of time t, thereby producing a steaming cycle schedule.

9. A system for scheduling cyclic steaming of a plurality of petroleum-containing wells comprising:
(a) a processor;
(b) a memory operatively connected to the processor, the memory containing a program adapted to be executed by the processor, said program comprising:
(c) a production-predicting means configured for receiving an input of a plurality of data describing at least in part past cyclic steaming and resulting production of a plurality of petroleum-containing wells, and for processing said data outputting a plurality of production predictions for said plurality of wells during a future steaming cycle;
(d) an Optimal Cycle Length (OCL) determining means configured and adapted for varying $t_{prod}$ to maximize the equation $$\frac{f(t)}{t_{stm} + t_{soak} + t_{prod}}$$

where $t_{stm}$ is steaming time, $t_{soak}$ is soaking time, $t_{prod}$ is production time, and f(t) is an objective function of time t, thereby determining an initial steaming cycle schedule;

(e) an optimization means configured for receiving as input said output of said production-predicting means and configured for receiving as input said initial steaming cycle schedule from the OCL determining means and other steaming cycle schedules for said plurality of wells, and for processing said plurality of production predictions and said steaming cycle schedules by the steps comprising:
(1) determining a ranking for said initial steaming cycle schedule for said plurality of production predictions against a pre-determined ranking criteria;
(2) producing in a schedule optimization algorithm a plurality of new steaming cycle schedules based on said ranking of said initial steaming cycle schedules;
(3) determining a ranking for said new steaming cycle schedules against said pre-determined ranking criteria;
(4) repeating said production of new steaming cycle schedules and determining ranking steps until a pre-determined termination criteria is met; and
(5) outputting a final steaming cycle schedule.

10. The system of claim 9, wherein said schedule optimization algorithm is a genetic algorithm.

11. The system of claim 10, wherein said genetic algorithm receives as input a plurality of chromosomes consisting of cyclic steaming schedules and the ranking criteria for each, mixes portions of two or more of each of said schedules to produce new schedules.

12. The system of claim 11, wherein said genetic algorithm is further configured to randomly modify at least a portion of said new schedules, thereby resulting in modified new schedules which are not direct combinations of portions of the input schedules.

13. The system of claim 9, wherein said pre-determined ranking criteria are selected from the group consisting of total production, total steam usage, total water production, total cost, total energy efficiency, and mixtures thereof.

14. The system of claim 9, wherein said pre-determined termination criteria are selected from the group consisting of total iterations, percent change in said ranking criteria, and mixtures thereof.

15. The system claim 9, wherein said production-predicting means is further configured for receiving as input the output of a reservoir simulation means which models past steaming cycles of a plurality of petroleum-containing wells.

16. A system for scheduling cyclic steaming of a plurality of petroleum-containing wells comprising:
(a) a processor;
(b) a memory operatively connected to the processor, the memory containing a program adapted to be executed by the processor, said program comprising:
(c) a production-predicting means configured for receiving an input of a plurality of data describing at least in part past cyclic steaming and resulting production of a plurality of petroleum-containing wells, and for processing said data outputting a plurality of production predictions for said plurality of wells during a future steaming cycle; and
(d) a scheduling means configured for receiving as input said output of said production-predicting means, and configured for determining an Optimal Cycle Length (OCL) steaming schedule for said plurality of wells comprising means adapted and configured for varying $t_{prod}$ to maximize the equation $$\frac{f(t)}{t_{stm} + t_{soak} + t_{prod}}$$

where $t_{stm}$ is steaming time, $t_{soak}$ is soaking time, $t_{prod}$ is production time, and f(t) is an objective function of time t.

17. A method of scheduling cyclic steaming of a plurality of petroleum-containing wells comprising:
  (a) inputting to a production-predicting means a plurality of data describing at least in part past cyclic steaming and resulting production of a plurality of petroleum-containing wells, wherein said production-predicting means comprises a computer-implemented algorithm stored in a computer memory, and is processed in a computer processor in communication with said computer memory and a computer storage, an computer input and an computer output devices;
  (b) processing said data in said production-predicting means and outputting a plurality of production predictions for said plurality of wells during a future steaming cycle;
  (c) inputting said plurality of production predictions into an Optimal Cycle Length (OCL) scheduling means configured to vary $t_{prod}$ to maximize the equation $$\frac{f(t)}{t_{stm} + t_{soak} + t_{prod}}$$

where $t_{stm}$ is steaming time, $t_{soak}$ s soaking time, $t_{prod}$ is production time, and f(t) is an objective function of time t, and thereby produce an initial steaming cycle schedule;
  (d) inputting said plurality of production predictions and said initial steaming cycle schedule for said plurality of wells into an optimization means;
  (e) processing said plurality of production predictions and said initial steaming cycle schedule in said optimization means by the steps comprising:
    (1) determining a ranking for said initial steaming cycle schedule for said plurality of production predictions against pre-determined ranking criteria;
    (2) producing with a genetic algorithm a plurality of new steaming cycle schedules based on said ranking of said initial steaming cycle schedule;
    (3) determining a ranking for said new steaming cycle schedules against said pre-determined ranking criteria;
    (4) repeating said production of new steaming cycle schedules and determining ranking steps until a pre-determined termination criteria are met; and
    (5) outputting a final steaming cycle schedule.

18. The method of claim 17, wherein said pre-determined ranking criteria are selected from the group consisting of total production, total steam usage, total water production, total cost, total energy efficiency, and mixtures thereof.

19. The method of claim 18, wherein said genetic algorithm receives as input a plurality of chromosomes consisting of cyclic steaming schedules and the ranking criteria for each, mixes portions of two or more of each of said schedules to produce new schedules.

20. The method of claim 19, further comprising randomly modifying at least a portion of said new schedules, thereby resulting in modified new schedules which are not direct combinations of portions of the input schedules.

21. The method of claim 17, wherein said pre-determined termination criteria are selected from the group consisting of total iterations, percent change in said ranking criteria, and mixtures thereof.

22. The method claim 17, wherein said inputting step (a) further comprises inputting to said production-predicting means the output of a reservoir simulation means which models past steaming cycles of a plurality of petroleum-containing wells.

23. A method of scheduling cyclic steaming of a plurality of petroleum-containing wells comprising:
  (a) inputting to a production-predicting means a plurality of data describing at least in part past cyclic steaming and resulting production of a plurality of petroleum-containing wells, wherein said production-predicting means comprises a computer-implemented algorithm stored in a computer memory, and is processed in a computer processor in communication with said computer memory and a computer storage, an computer input and an computer output devices;
  (b) processing said data in said production-predicting means and outputting a plurality of production predictions for said plurality of wells during a future steaming cycle;
  (c) inputting said plurality of production predictions into an Optimal Cycle Length (OCL) scheduling means configured to vary $t_{prod}$ to maximize the equation $$\frac{f(t)}{t_{stm} + t_{soak} + t_{prod}}$$

where $t_{stm}$ is steaming time, $t_{soak}$ is soaking time, $t_{prod}$ is production time, and f(t) is an objective function of time t, and thereby produce a steaming cycle schedule; and
  (d) outputting said steaming cycle schedule.

24. A machine for scheduling cyclic steaming of a plurality of petroleum-containing wells comprising:
  (a) a plurality of databases for storing data comprising well data, steam plant data, and schedule data;
  (b) a processor;
  (c) a memory operatively connected to the processor and the plurality of databases, the memory containing a program adapted to be executed by the processor, said program comprising:
  (c) a production-predicting means configured for receiving an input of a plurality of data from the plurality of databases describing at least in part past cyclic steaming and resulting production of a plurality of petroleum-containing wells, and for processing said data outputting a plurality of production predictions for said plurality of wells during a future steaming cycle;
  (d) an Optimal Cycle Length (OCL) determining means configured and adapted for varying $t_{prod}$ to maximize the equation $$\frac{f(t)}{t_{stm} + t_{soak} + t_{prod}}$$

where $t_{stm}$ is steaming time, $t_{soak}$ is soaking time, $t_{prod}$ is production time, and f(t) is an objective function of time t, and thereby determining an initial steaming cycle schedule;

(e) an optimization means configured for receiving as input said output of said production-predicting means, and configured for receiving as input said initial steaming cycle schedule from the OCL determining means and other steaming cycle schedules for said plurality of wells, and for processing said plurality of production predictions and said steaming cycle schedules by the steps comprising:

(1) determining a ranking for said initial steaming cycle schedule for said plurality of production predictions against a pre-determined ranking criteria;

(2) producing in a schedule optimization algorithm a plurality of new steaming cycle schedules based on said ranking of said initial steaming cycle schedules;

(3) determining a ranking for said new steaming cycle schedules against said pre-determined ranking criteria;

(4) repeating said production of new steaming cycle schedules and determining ranking steps until a pre-determined termination criteria is met; and (5) outputting a final steaming cycle schedule.

* * * * *